Figure 1:
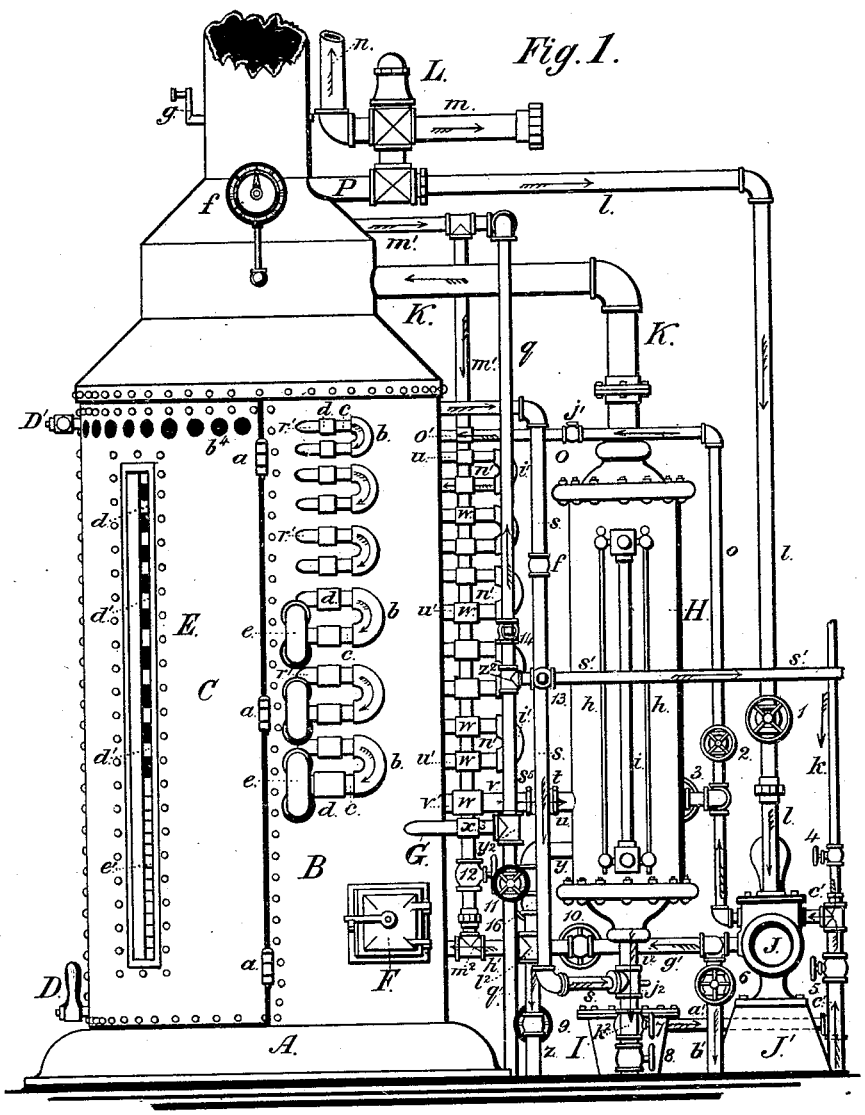

(No Model.)  W. F. BROWNE.  12 Sheets—Sheet 1.

MOTIVE POWER GENERATOR.

No. 263,311.  Patented Aug. 29, 1882.

Witnesses:
Arthur W. Houghton
Edward D. O'Brien

Inventor,
Wm. Frank Browne (No Model.)

12 Sheets—Sheet 3.

W. F. BROWNE.
MOTIVE POWER GENERATOR.

No. 263,311.          Patented Aug. 29, 1882.

Witnesses:
Arthur W. Houghton
Edward J. O'Brien

Inventor,
Wm Frank Browne

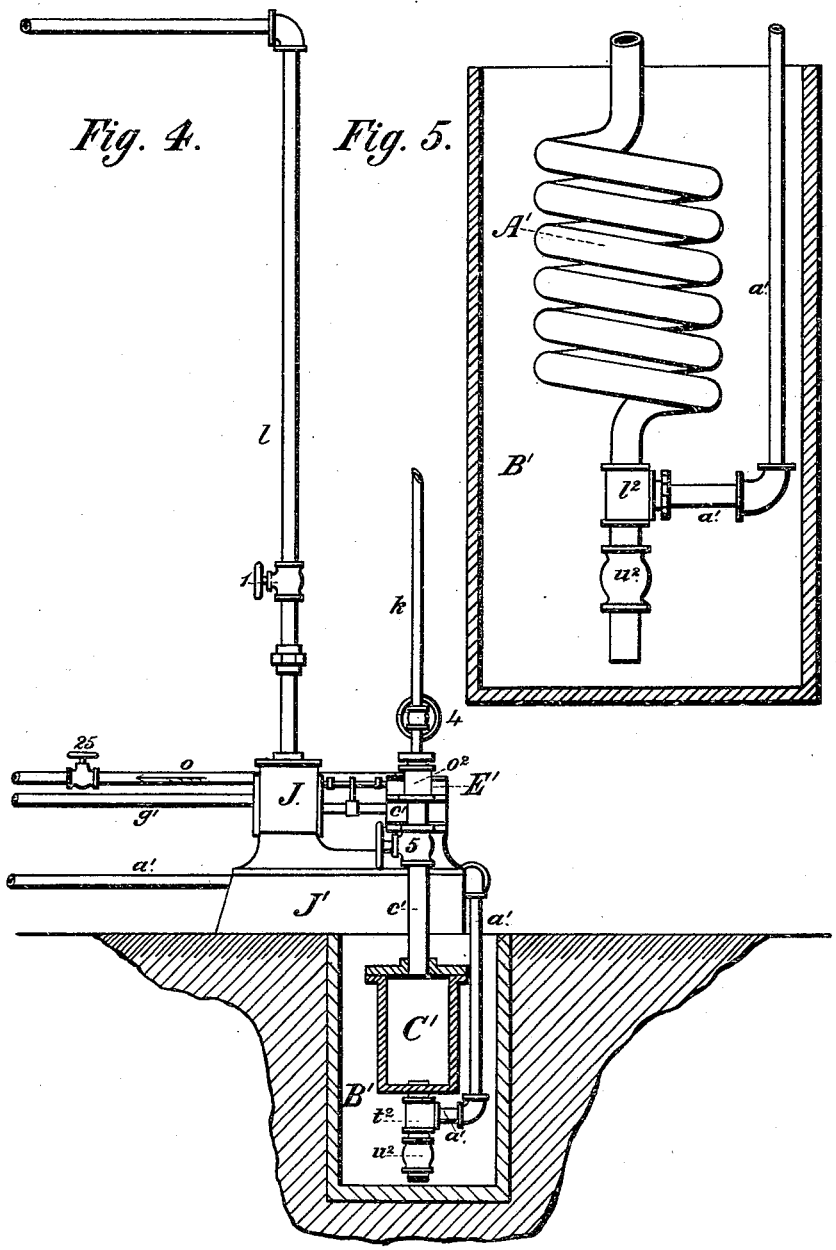

(No Model.)

W. F. BROWNE.

MOTIVE POWER GENERATOR.

No. 263,311. Patented Aug. 29, 1882.

(No Model.)   W. F. BROWNE.   12 Sheets—Sheet 6.
MOTIVE POWER GENERATOR.
No. 263,311.   Patented Aug. 29, 1882.

(No Model.) 12 Sheets—Sheet 7.

W. F. BROWNE.
MOTIVE POWER GENERATOR.

No. 263,311. Patented Aug. 29, 1882.

Witnesses:
Arthur W. Houghton
Edward D. O'Brien

Inventor
Wm Frank Browne (No Model.)                 W. F. BROWNE.           12 Sheets—Sheet 8.
MOTIVE POWER GENERATOR.
No. 263,311.                           Patented Aug. 29, 1882.
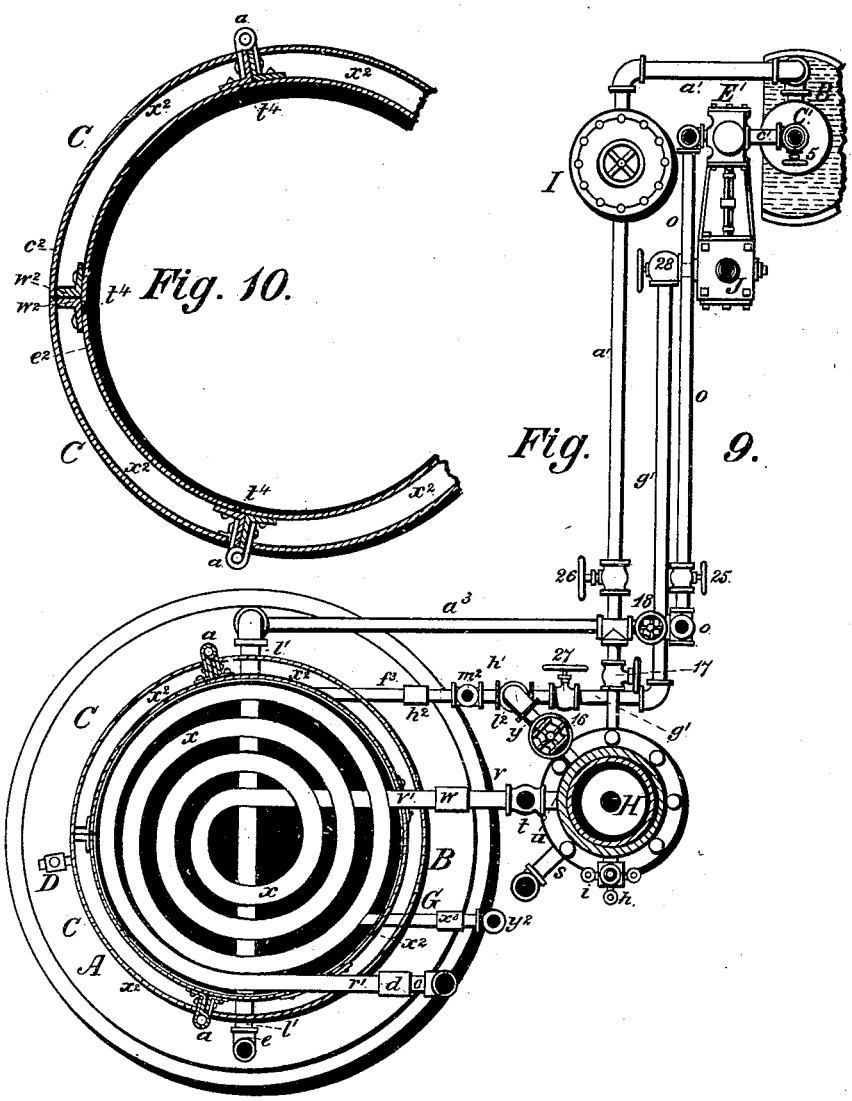
Witnesses:—
Arthur W. Houghton
Edward D. O'Brien
Inventor
W<sup>m</sup> Frank Browne (No Model.) 12 Sheets—Sheet 9
W. F. BROWNE.
MOTIVE POWER GENERATOR.
No 263,311. Patented Aug. 29, 1882.
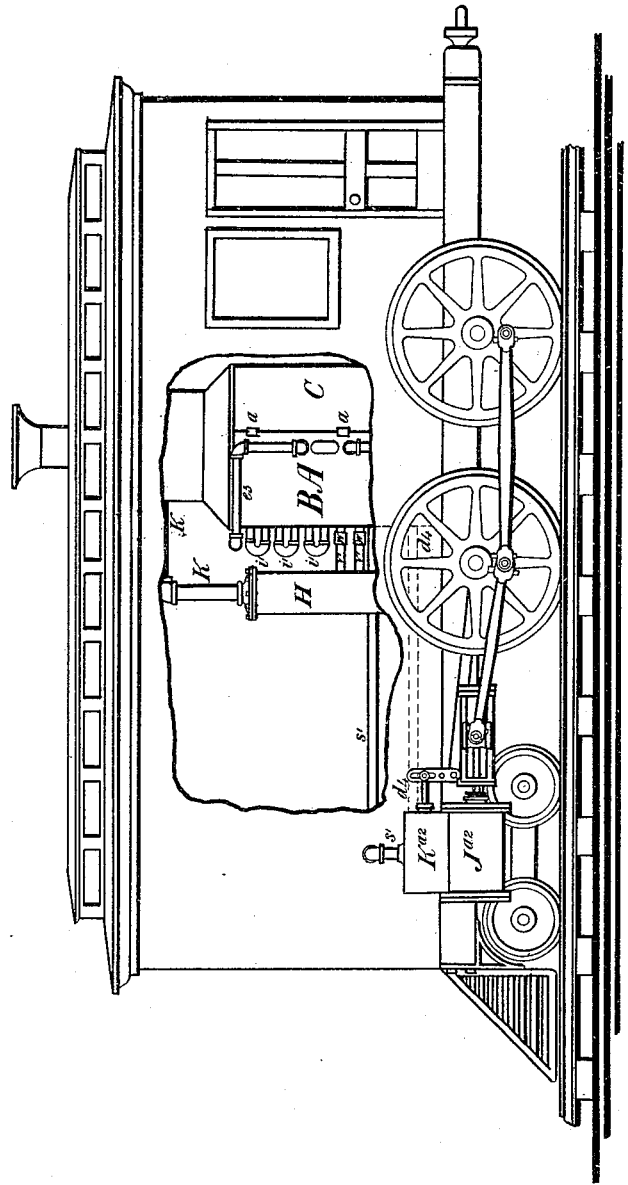
Witnesses:-
R. Sylvani.
E. H. Legrang
Inventor:-
Wm Frank Browne

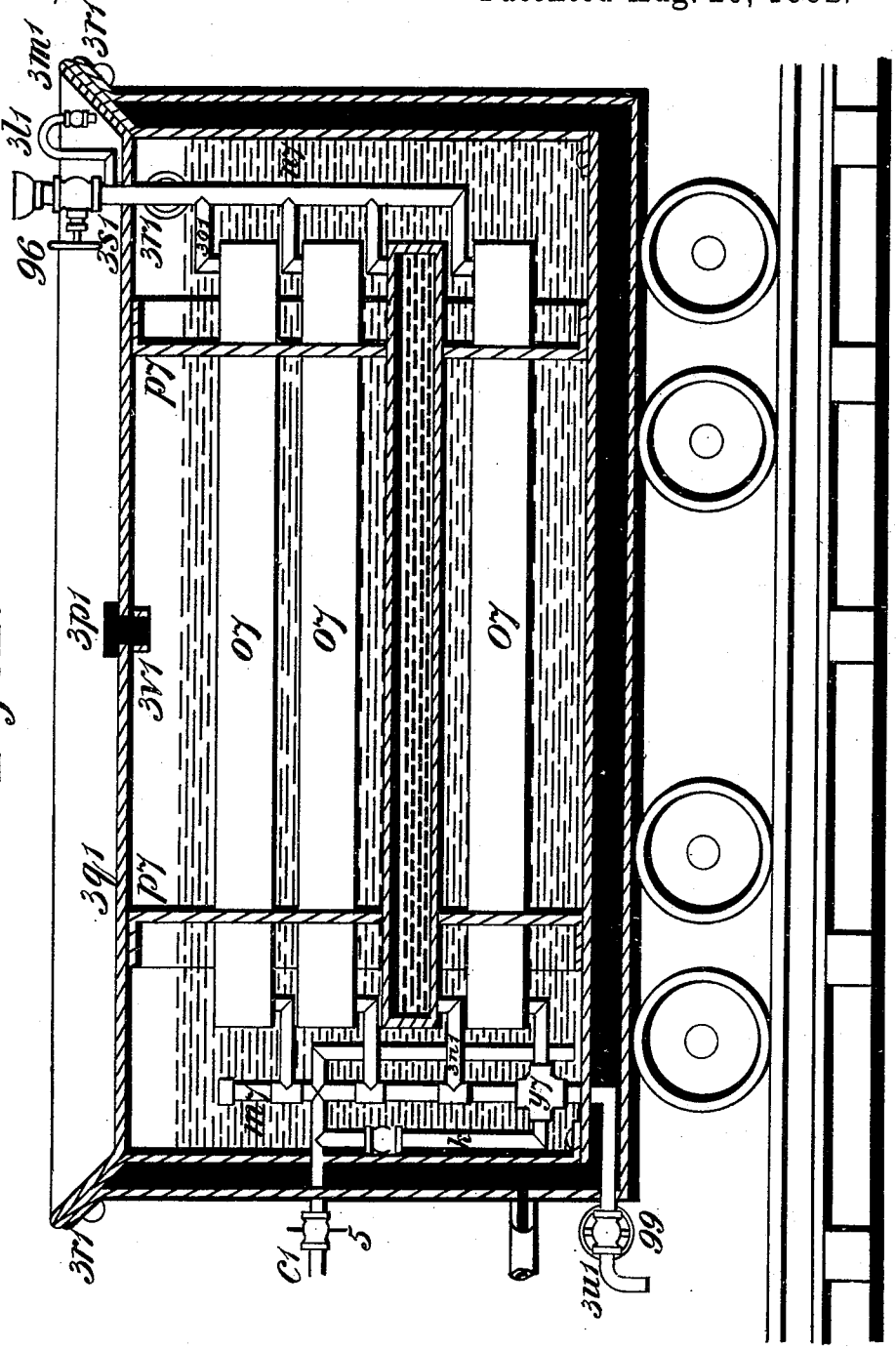

(No Model.) 12 Sheets—Sheet 11.
W. F. BROWNE.
MOTIVE POWER GENERATOR.
No. 263,311. Patented Aug. 29, 1882.

WITNESSES

INVENTOR (No Model.) 12 Sheets—Sheet 12.
W. F. BROWNE.
MOTIVE POWER GENERATOR.
No. 263,311. Patented Aug. 29, 1882.
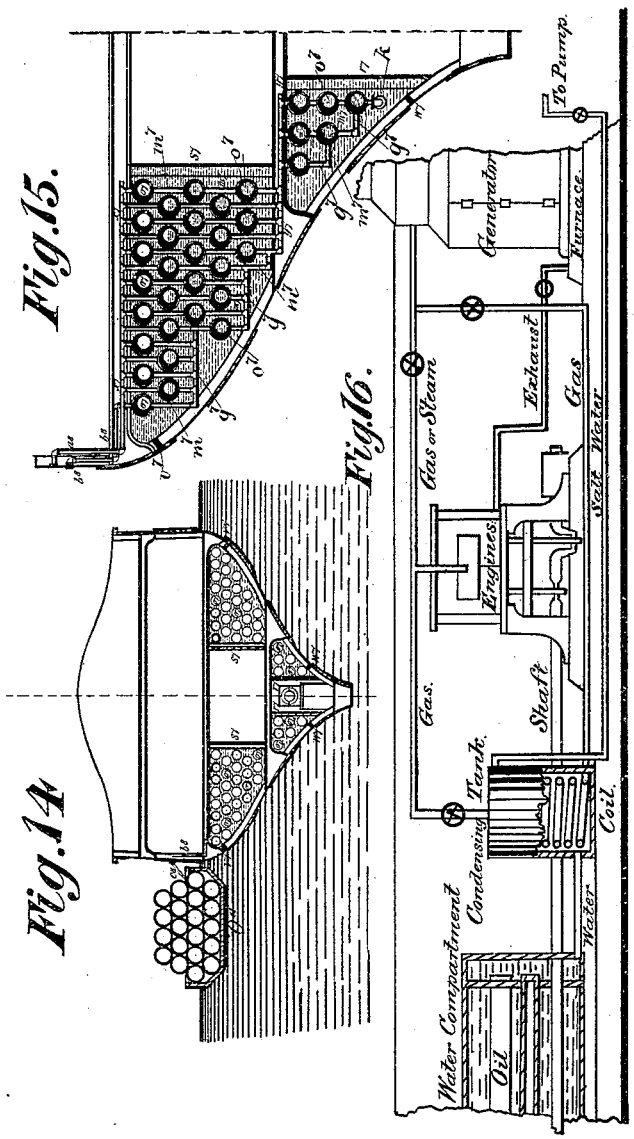
Witnesses:-
Inventor:-
Wm Frank Browne

UNITED STATES PATENT OFFICE.

WILLIAM FRANK BROWNE, OF NEW YORK, N. Y.

MOTIVE-POWER GENERATOR.

SPECIFICATION forming part of Letters Patent No. 263,311, dated August 29, 1882.

Application filed December 22, 1881. (No model.)

*To all whom it may concern:*

Be it known that I, WM. FRANK BROWNE, of the city, county, and State of New York, have invented certain new and useful Improvements in Motive-Power Generators for Land and Water Transportation; and I hereby declare that the following is a clear and full description thereof, reference being had to the accompanying drawings, which form a part of this specification.

This invention relates to an improved method and means for generating a motive power from water and combustible liquids for driving engines or motors and burning the exhaust thereof, the object being to prevent the enormous waste in fuel which is known to exist and escape from all of the locomotive, marine, and other furnaces now in use.

The invention consists, first, in generating gas under high pressure in a gas-generating apparatus and cooling the same, and then utilizing said high pressure as a motive power for driving-motors in floating vessels, and in utilizing the exhaust-gas from said motors as a fuel in the furnace of the said gas-generating apparatus to generate said gas or motive power; second, in the means and arrangement thereof for storing combustible liquids in a floating vessel, whereby said combustible liquid is kept at a low and even temperature by means of a constant circulation of water around the receiver containing the combustible liquids while the vessel is in motion, said means being so connected as to communicate the fluid to each other and to be all filled and emptied from a common source; third, in generating gas under high pressure in a suitable generator located upon a locomotive and utilizing the high pressure of said gas as a motive power for driving the engines of said locomotive and burning the exhaust-gas from said engines in the furnace of said generator; fourth, in dividing the tender of a locomotive into separate compartments for water and combustible liquid, which are to be used to generate gas or gaseous vapor therefrom for motive power to drive the locomotive-engine with, the exhaust from which is discharged into the furnace for combustion, whereby heat is derived to generate the gas or gaseous vapor for the said motive power.

Figure 2:
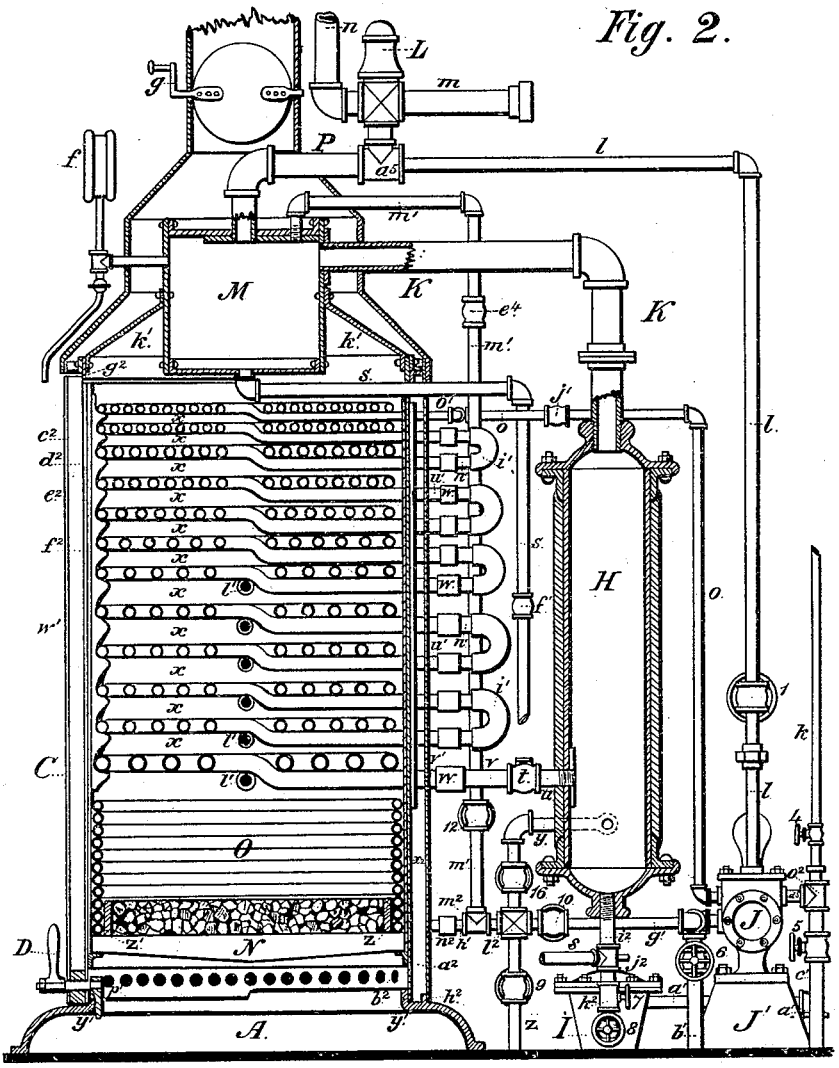
Figure 3:
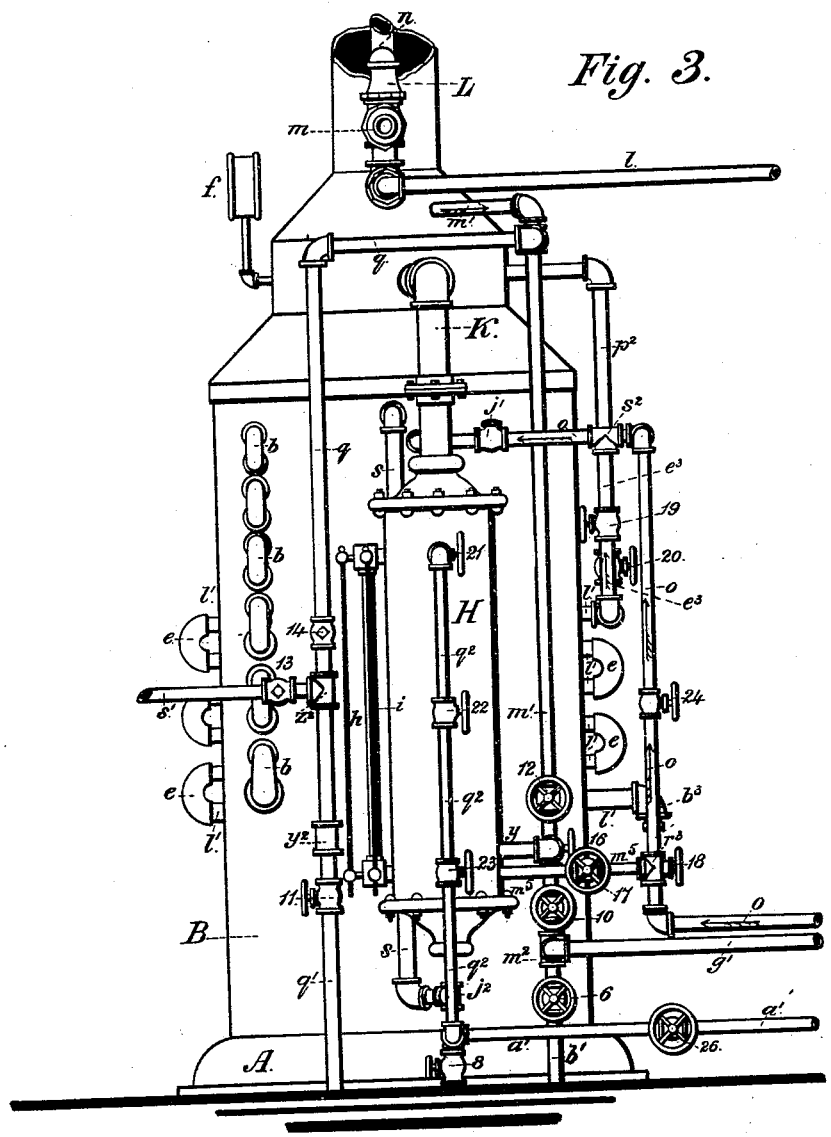
Figure 6:
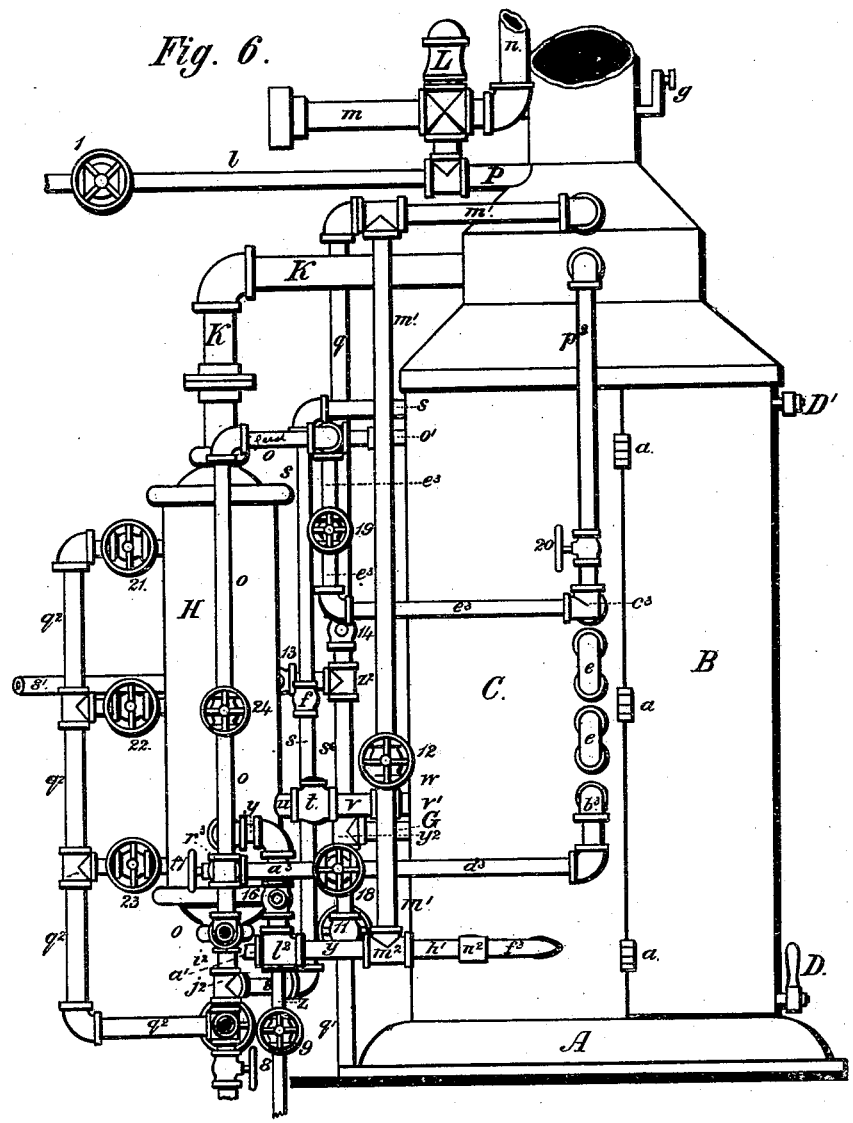
Figure 7:
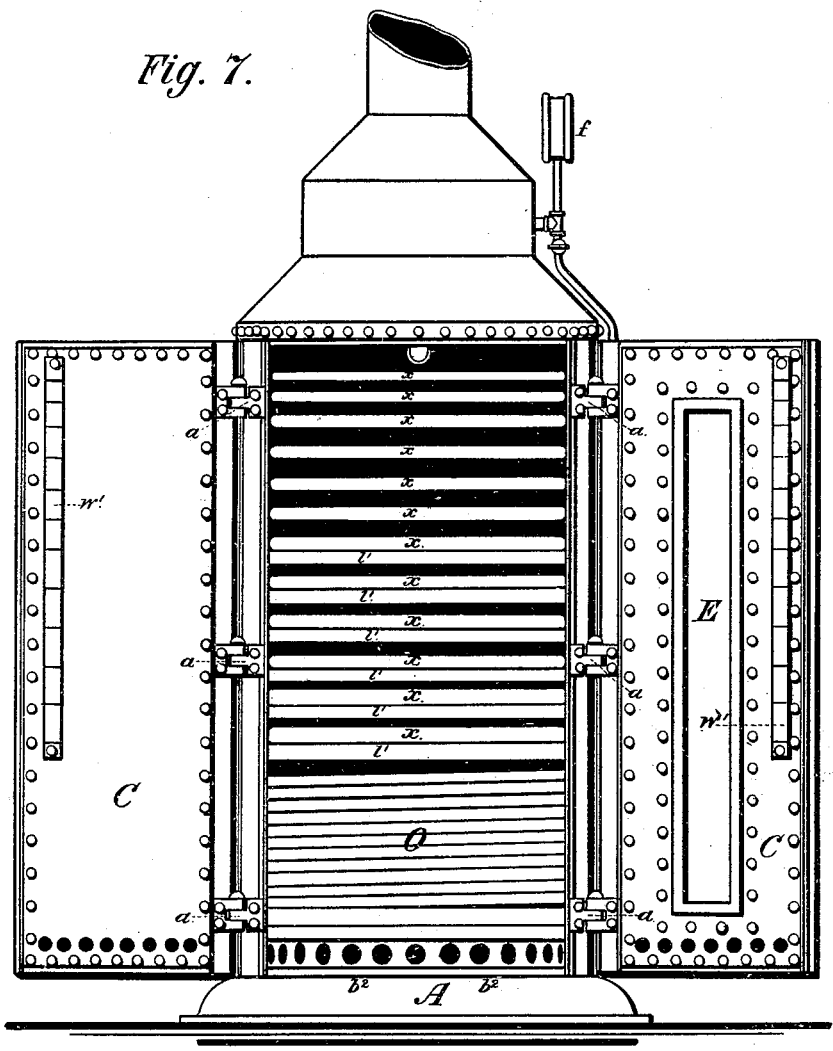
Figure 8:
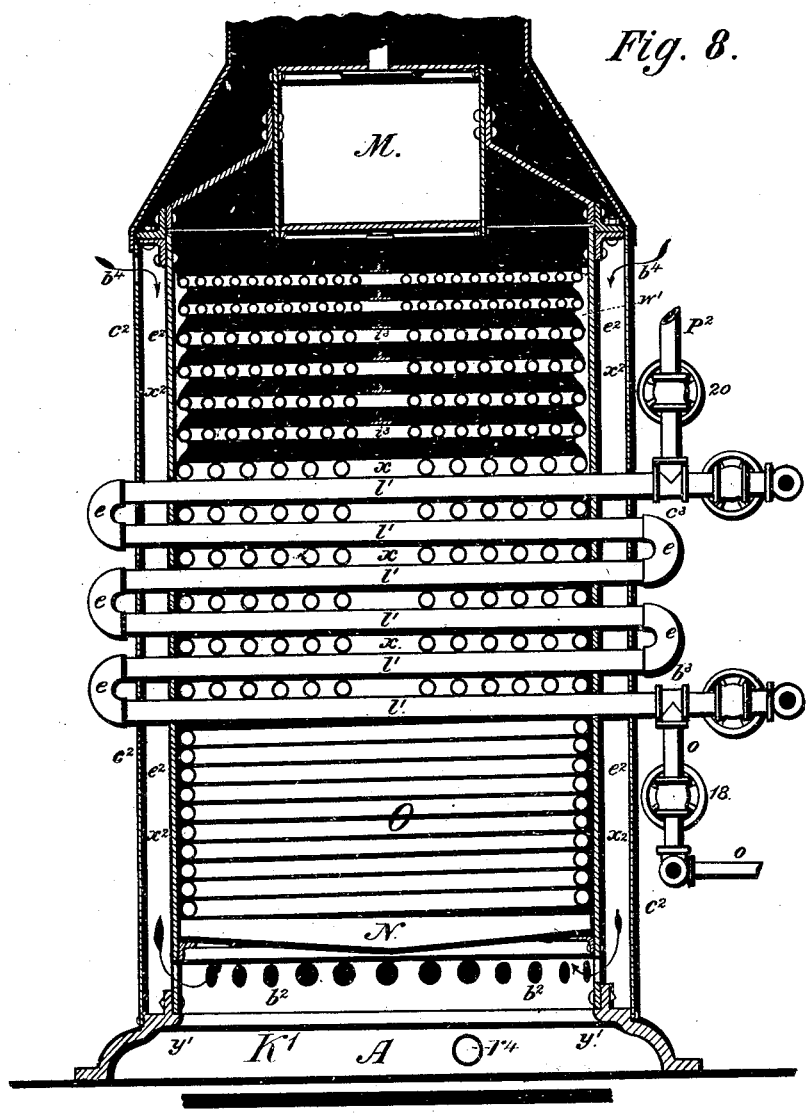
Figure 13:
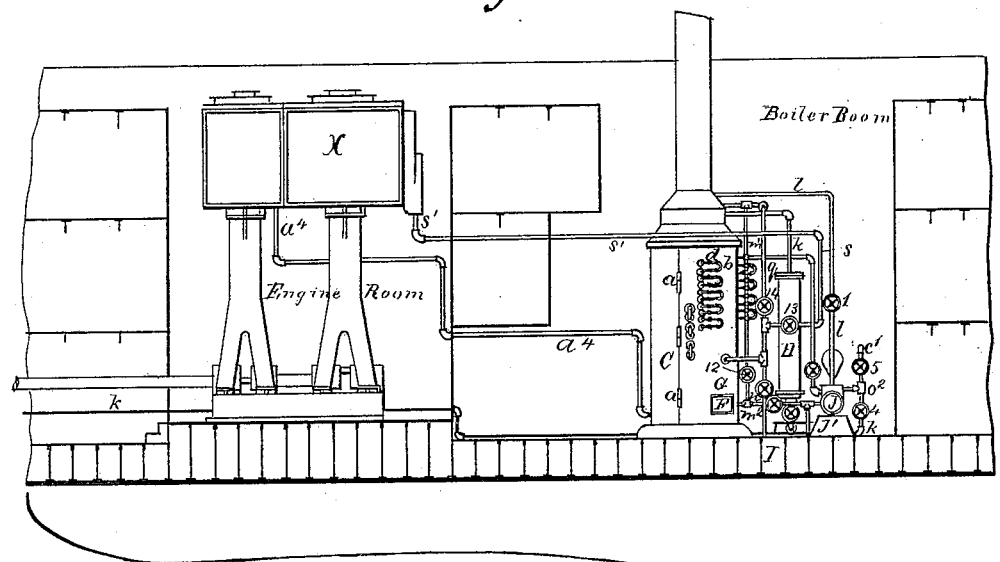

Figure 1 is the right-hand side elevation of a high-pressure gas or gaseous-vapor generator. Fig. 2 is a vertical central section of the high-pressure gas or gaseous-vapor generator, showing the arrangement of the sectional generators in which the high-pressure gas or gaseous vapor is generated. Fig. 3 is a rear elevation of the high-pressure gas or gaseous-vapor generator, showing the pipe-connection between the said generator and the pump and hot-liquid-feeding device shown in Fig. 4. Fig. 5 is a modification of the hot-liquid-feeding device shown in Fig. 4. Fig. 6 is the left-hand side elevation of the high-pressure gas or gaseous-vapor generator shown in Fig. 1. Fig. 7 is the front elevation of the high-pressure gas or gaseous-vapor generator with two doors open, thus exposing the coils or conduits in which the gas or gaseous vapor is generated. Fig. 8 is a vertical central section of the generator, showing the tubular supporting-bars with end connections and connecting-pipes for circulating liquids therein. Fig. 9 is the sectional plan view of the generator and separator into which the high-pressure gas or gaseous vapor is discharged, showing the form and arrangement of one of the conduits, the outer and inner shell surrounding said conduit, and also a plan view of the pump, trap, and connecting-pipes. Fig. 10 is an enlarged broken horizontal section of the shell or casing, showing the space between the outer and inner shells and the arrangement of the doors therewith. Fig. 11 is a view of a locomotive with a high-pressure-gas-generating apparatus therein, in which a gas is generated for motive power to drive the locomotive with, while the exhaust from the engines is conducted to and burned in the furnace of the gas-generating apparatus. Fig. 12 is the longitudinal sectional representation of the tender of a locomotive, which is divided into suitable compartments for the purpose of holding the materials from which the motive power is generated and which generates said motive power. Fig. 13 is a vertical longitudinal broken section of a steamship, showing a high-pressure-gas-generating apparatus in which gas is generated for motive power to propel the boat with, while the exhaust-gas from the engine is burned in the furnace of the generator to generate the gas. Fig. 14 is a transverse section of a steamship, showing the method of transporting combustible liquids, which is connected by pipes, conduits, &c., as seen in Fig. 13. Fig. 15 is an enlarged transverse sectional view of one-half of a steamship, showing the manner of connecting the receivers or tanks which hold the combustible liquids. Fig. 16 is a broken vertical central section of a steamship, showing a high-pressure gas or gaseous-vapor generator in connection with a cooling device where the high-pressure fixed gas is cooled prior to its induction into the motor.

Like letters of reference designate corresponding parts in the several figures.

The base A, which is shown in several of the figures, is made preferably of cast-iron, and when of large diameter, or for transportation, it should be made in two or more sections, with suitable flange-connection thereon, which, when put together, are held securely in place by suitable bolt-fastenings.

The stationary portion of the shell B is mounted upon the base A, and firmly secured thereto by bolts or rivets, and when the base is made in sections the shell portion B can be made to conform thereto, and the parts or sections properly secured by any well-known mechanical device or devices. One side or section of the stationary part of the shell is divided into two doors, C, which swing upon the hinges $a$, and are kept closed by the fastening devices D D' and $p'$, as shown in Figs. 1, 2, and 6. These devices will hold the upper and lower ends of the doors firmly in place, while the center can be held by a suitable clasp or other device should the heat within the shell be intense enough to spring them asunder. These doors constitute a very important feature of this invention. They embrace nearly one-half of the shell in diameter and height, and necessarily so, in order that the proper functions should be performed thereby. One of the doors is provided with a window, E, which extends nearly the length of the door. The frame of the window is made preferably of cast metal and riveted to the shell or casing of the door, and is provided with mica or suitable glass covering, through which the interior of the shell and the internal parts thereof are observed. The frames of the doors E are made from suitable angle-iron, either rolled from wrought-iron or made from cast metal. When made from cast metal the pattern can be formed into all the necessary curvatures, projections, rivet and bolt holes thereto. To this frame the outer and inner casings of metal, $c^2$ $e^2$, are riveted, thus forming a clear space, $x^2$, which extends from the top to the bottom of the body of the generator. The outer casing of metal is provided with apertures $b^4$ at the top, while the inner casing of metal is provided with corresponding apertures, $b^2$, at the bottom thereof. These apertures are for the purpose of admitting the air at the top of the shell into space $x^2$, where it becomes heated on its downward passage, and is drawn through the bottom apertures, $b^2$, into the ash-pit, and thence upward between the grate-bars, where in its heated condition it mingles with the fuel and supports the combustion thereof. The draft can be accelerated by a jet of steam or air within the stack, or by suitable connections and devices arranged at the top of the shell, whereby air can be forced in and downward into the ash-pit, and thence upward; and, also, the air can be blown directly into the ash-pit K', as indicated in Fig. 8, at $r^4$.

In the broken horizontal sectional view, Fig. 10, it will be observed that at the joint between the two doors C C the frame or angle-iron $w^2$ $w^2$ and also the edge $t^4$ of the inner shell, $e^2$, overlap and cover the joint formed by the frame or angle-irons to which the hinges $a$ are secured. By this arrangement a tight or close joint is obtained. It will also be observed in Figs. 9 and 10 that the doors do not occupy quite one-half of the diameter of the shell, although one-half may be so occupied; but when made as represented in the drawings the stationary portion will be much firmer than if it did not pass the central line. The width of the door is determined by the diameter of the coil or conduits within the shell. The top of the shell or body of the generator is provided with a suitable bonnet and stack thereto.

The interior of the shell is provided with conduits or coils $x$, mounted or supported upon suitable supporting devices, $w'$, as shown in Figs. 2, 7, and 8, and upon pipe or tubing $l'$, as shown in sectional views, Figs. 2, 8, and 9, and in the elevations in Figs. 3 and 7. These pipes project through the shell, and are connected by return-bend fittings $e$, and in such manner that a free circulation of liquids can be maintained through the series, and as cool liquid is forced through these pipes they cannot become heated to a red heat. Consequently they serve the double purpose of supporting the coils and heating the liquid which may pass through them. These supporting-pipes can continue under each coil or each section of the generator; but as the heat is not great enough to heat the sections above the fifth or sixth lower ones to a red heat it is not necessary to continue them above the fifth or sixth coil or conduit; but if, when a gas-flame is employed, the flames should fill the coil chamber or shell, it might be necessary to introduce several more of the supporting-pipes. These sections, which are unsupported by pipes, must be kept in position by straps or bars of iron secured to the turns of the coils by clips or other suitable contrivances. A cross-section of these bars or straps $i^3$ is represented in Fig. 8. The coils or conduits are coiled from pipe which is drawn to the required length, or from short lengths of pipe which are welded at their ends until the required length is obtained. The first or inner turn should be made as small as possible without flattening the pipe. After the section is completed the two ends of the pipe should project tangentially to the inner and outer circle, and parallel, or nearly so, to each other. These projecting ends should be long enough to project through the outer shell and receive suitable fittings thereon. The external projecting end lies within the plane of the coiled section, while the inner end is bent at the commencement of the turn, and after the coil is completed it is heated and bent until it comes in contact with the surface of the coiled section, as shown in Fig. 2, where it will be observed that one-half of the coiled section rests upon said projecting inner ends. The coiled section should be made of pipe of different diameters. The section or sections containing pipe of the largest diameter should be placed at the bottom of the series, while the smallest pipe should be at the top. A good rule to adopt in making these sections would be to allow the space between each turn to equal the internal diameter of the pipe. Thus a good and free flue-space is obtained. The size or diameter of the pipe should be greater or less, or in accordance with the different diameters of the shell, and also the number of the section should increase with an increased diameter of the said shell.

The superheating-coil O is located in the fire-box for the purpose of gaining additional heating surface and utilizing heat. The two ends of this coil project through the shell or wall, as shown in Figs. 2 and 9. This coil is shown resting upon the grate-bars. Consequently the complete turns cannot extend below the top of the door, while the remaining turns are provided with return-bends on each side of said door, whereby a continuous circulation is obtained through the entire length of pipe forming the superheater. When gas is to be burned in the furnace in lieu of other fuels the superheating-coil can be coiled in continuous turns until completed, thus avoiding the return-bends, and also the superheating-coil O can be dispensed with, and the place now occupied with said coil and fuel can be filled with a suitable number of spiral conduits, which can serve the purpose of a superheater.

In sectional view, Fig. 2, a fire-brick, Z', is shown, which is for the purpose of protecting the bottom of the superheater, and also a lining of asbestus board or of asbestus cement, $f^2$, or other material of an analogous nature, is introduced between the inner casing or shell and the coils or conduits, whereby protection is given to the shell and radiation of heat retarded.

The ends $r'$ of the external turns of the coiled sections (shown in Figs. 1 and 9) are connected by right and left couplings $d$ and nipples $c$ to return-bends $b$, while the inner ends, $u'$, with the exception of the upper and one or more of the lower ends, are connected by right and left couplings $w$ and nipples $n'$ to return-bends $i'$. The end of the upper coil, O', is connected by right and left couplings to the pipe O, which is provided with a check-valve, $j'$, and valve Q, which controls or regulates the flow of the liquid as it is being forced by the pump into the upper conduit, whence it circulates by force through the entire length of said conduit and is discharged through the lower end, $v'$, coupling $w$, nipple $v$, check-valve $t$, and nipple $u$ into separator H, wherein the steam, vapor, or gas separates from the condensations or from the liquids which may be discharged therein without evolving into steam, vapor, or gas. The separator is kept free from said liquid matter by the trap I, which forces or discharges the liquid through pipe $a'$ into a device whereby it will be returned to the generator for subsequent evaporation. In Fig. 4 a device, C', for this purpose is shown. This device consists of a box or cylinder of suitable size and shape, and strong enough to withstand the pressure of the generator, and it is located in the cistern B' and kept constantly filled and surrounded with water or liquid matter. A nipple is screwed into the bottom of this device. To this nipple a T-fitting, $t^2$, is attached, and to the other end thereof a nipple and vertical check-valve, $u^2$, are screwed, while to the outlet of the T-fitting the discharge-pipe $a'$ is affixed.

The induction-pipe $c'$, which is provided with a valve, 5, connects the device C' to the pump, which, when in operation, draws the water or liquids through check-valve $u^2$, cylinder C', and induction-pipe $c'$, and forces it into and through eduction-pipe $o$ into the conduits or coils within the generator, whereby the liquids or water is circulated down through the heated conduits or coils, and is discharged in the form of steam, vapor, or gas and liquid into the separator, whence the volatile parts escape to and through pipe K to the dome M, while the liquid matter escapes into the trap and is discharged through pipe $a'$ into the device C', which action closes the vertical check-valve and prevents the liquid in the cistern from entering device C' until the trapped liquid has been discharged therefrom and returned to the generator, after which the check-valve $u^2$ opens and allows the liquids from the cistern to pass to the pump. The cylinder C' should be of sufficient capacity to hold liquid enough to reduce the temperature of the trapped liquid so it can pass through the pump without eliminating steam, vapor, or gas, which would, if eliminated, cushion the valves and piston and prevent the eduction of liquids in the pump.

In Fig. 5 a modification of the above-described device is shown, in which A' represents a coil through which the liquids flow from the cistern B' to the pump. The remainder of the connection and operation is the same as above described.

The dome M (shown in Fig. 2) is supported by braces $k'$, and is provided with the necessary pipes for conducting away steam, vapor, or gas to places of use.

The safety device L is connected to pipe P by a suitable fitting, and also the safety device is provided with the blow-off pipe $n$ and a pipe, $m$, which can be used for conducting steam, vapor, or gas to a motor or other required place or places. To the T-fitting $a^5$ the pipe P is attached for conducting steam, vapor, or gas to the force-pump J. The flow through the pipe is controlled by valve 1.

$O^2$ is a T-fitting, to which the induction-pipe $c'$ of the pump is connected, valve 5 being the controlling-valve thereto. The T-fitting is connected to the pump by the nipple $d^5$. To the "run" of the T a small pipe, $k$, is connected for conducting the products of petroleum or liquid combustibles to the pump, the flow of which is controlled by valve 4. Therefore by means of the two induction-pipes $c'$ and $k$ and their valves water and the liquid combustibles can be conducted and drawn into the pump in any proportion required. Thus heating or illuminating gas can be made in the same apparatus at will or as occasion requires; and, also, by closing valve 4, with valve 5 remaining open, steam can be generated for any required purpose.

The pressure of the apparatus is indicated by the gage $f$. The draft to the furnace can be controlled by the damper $g$.

Steam, vapor, or gas is conducted from the dome through pipe $m'$ to the T-fitting $m^2$, which connects to or with the projecting end of the lower turn of the superheater. The flow of the steam, vapor, or gas into said superheater is controlled by valve 12, and the exit therefrom is through pipes $s^5$ and $s'$. These pipes are connected to the superheater by the right and left couplings $x^3$, a close nipple, and T-fitting $y^2$. The upper end of the long nipple $s^5$ is provided with a T-fitting, $z^2$. To the outlet of this fitting the discharge-pipe $s'$ is connected. This pipe is provided with a plug-cock, 13, for controlling the outflow of the superheated steam or gas.

To the upper end of the T-fitting $z^2$ the conducting-pipe $q$ is attached, while the other end is connected with pipe $m'$ by means of elbows, nipples, and a T-fitting. The flow in the pipe $q$ is controlled by stop-cock 14, and the purpose whereof is to convert the superheater into a hot-water circulator or a steam-generator when not employed as a superheater for superheating steam or for the fixation of gas.

The pipe $y$ connects the separator with the superheater O by means of nipples, elbows, and a cross-fitting, $l^2$. The flow of the liquid from the separator to the superheater is controlled by valve 16. A blow-off pipe controlled by valve 9 is connected to the cross-fitting $l^2$, which can be employed to drain the superheater, and also other connecting-pipes.

The exhaust-pipe $g'$ connects the exhaust-ports of the engine or motor with the cross-fitting $l^2$, whereby the exhaust from the engine is conducted into and through the superheater. Valve 10 is for the purpose of arresting the flow of the exhaust, which passes through the conducting-pipe $b$ on opening valve 6.

The dome M and separator H are connected by pipes $s$ and $i^2$; T's $j^2$, $k^2$, and nipple $i^5$ to the trap I for the purpose of conducting the condensation and liquid not evolved into steam, vapor, or gas away to the device $C'$, whereby it is returned to the generator, as shown in Figs. 1, 2, 3, and 4. The valve 7 is introduced between the trap, dome, and separator for the purpose of stopping the flow of liquid matter when the trap is to be cleaned or any of the parts connected to or with the trap may get out of order. In case this does occur, valve 8 can be opened, thereby allowing the trap-liquid to escape to a waste-pipe or to some other place until the repairs are effected.

A glass gage, $i$, with protecting-rods $h$, is attached to the side of the separator H to determine the height of the liquid in said separator.

By the aid of the nipple $q^2$ and valves 21, 22, and 23 the overflow can be kept to the height of either one of the valves, and be effectually controlled thereby when connected to the trap, although this discharge can be directly into the atmosphere, but not so effectually controlled as when connected to some trapping device.

In Fig. 11 a high-pressure gas or gaseous-vapor generator, B A, is shown through the broken side of a locomotive. Water and combustible liquids are forced into this generator through pipe $e^3$ into the top thereof, and thence circulated down through a series of conduits, which are connected by return-bends $i'$ and discharged therefrom through the ends $v'$ of the two lowermost conduits into the expansion-chamber H, from whence it is forced through pipe K into a dome located above the conduits, (shown in Fig. 2,) from whence the gas can be forced to the steam-chest $K^{a2}$ and engine $J^{a2}$, the exhaust therefrom being discharged through pipe $d^4$ into the furnace of the generator. If highly-heated gas is required, the gas or gaseous vapor can be forced from the dome to a superheater within the furnace, from thence through pipe $s'$ to the engine, and thence to the furnace through pipe $d^4$. (Shown in dotted lines.) The generator is provided with two doors, C, which swing upon hinges $a$. (Shown in Fig. 1.) The tender shown in Fig. 12 should be made of good boiler plate-iron and properly riveted together at all of the joints for the purpose of making the tender water-tight. Before riveting or bolting the top plate, $3^{d'}$, to the flange $3^{r'}$ two or more division-plates, $p^7$, should be riveted in their proper places. These division-plates support a suitable number of cylindrical reservoirs, $o^7$, suitably arranged and connected by circulating-pipes, whereby all of the combustible liquid contained therein can be drawn therefrom by a pump or other exhausting device, and forced, with water drawn from the interior of the tender, into the generator shown in Fig. 11. The cylinder $o^7$ is connected by pipes $3^{iii'}$, secured to the under side, and near the end thereof, of said cylinder, while the other end of the pipes are connected to a horizontal pipe, $y^7$, near the bottom of the tender. To this pipe $y^7$ the eduction-pipe $k$ is connected, for the purpose of conducting the combustible liquids from the cylinder when said liquid is to be forced into the high-pressure generator. Valve 4 is for controlling the quantity of liquid which is drawn to the pump or other forcing device, and valve 5 is for regulating the amount of water which is drawn to the injecting device.

The cylindrical tanks are filled on turning valve 96 through pipe $3^{s\prime}$. This pipe is connected to the horizontal pipe $3^{t\prime}$, which in turn connects with a series of vertical pipes, $n^7$. These pipes are connected with each of the cylinders $o^7$ by the small pipe $3^{o\prime}$. These pipes are connected to the upper side of the cylinder for the purpose of avoiding an air-chamber and filling said cylinder full. The siphon $3^{v}$ is for the purpose of admitting air into the cylinder to supply the displacement occasioned by drawing off the liquid. The check-valve $3^{m\prime}$ opens upward by the pressure of air and is closed by back-pressure or its own weight. Whenever it becomes necessary to drain the cylinder of liquid, open valve 99 on pipe $3^{w}$. The tank or tender is supplied with water on removing plug $3^{p\prime}$ through opening $3^{v\prime}$. These tenders can be made in two compartments, in which combustible liquid and water can be stored separately; but the cylindrical form as arranged and submerged in water is entirely protected from fire, and also not so liable to injury from accidents or collisions, as would be the case were the combustible liquid to be in a tank so arranged that there would be but one thickness of iron to protect said liquid.

The following means can be instituted for preventing the water from freezing in cold climates. The tender can be provided with a jacket, leaving a clear space of from four to ten inches (more or less) all around the sides, top, and bottom thereof. Hot gases can be forced therein; or steam can be generated independently of the generation of the gaseous vapor by using an independent injector, which will force water into the superheater and generate steam enough to force into said jacketed space and keep the said water from freezing; or the exhaust-gas can be forced in said jacketed space, and from thence forced into the furnaces; and, furthermore, a sufficient amount of gas can be forced under pressure into said jacketed space to start the fire and generate more gas or gaseous vapor to start the locomotive with. This gas for subsequent use can be compressed into the jacketed space, after the locomotive is laid up to rest, simply by passing the gaseous vapor through the superheater, and from thence into said space, all of which can be done in a very few minutes, and thus a supply of gas can always be ready and with proper connections to illuminate the train with; and, furthermore, the gas which would escape from the safety device when stopping at stations and on side tracks can, by turning a valve or two, be forced into the jacketed space for subsequent use. In cold weather gas enough can be saved from this source alone to heat the train with when provided with suitable stoves or radiators in which the gas can be burned. One great advantage derived from the use of this gas is that no cinders or smoke can be produced to add to the discomfort of the passengers, and also there will be no danger of setting fire to bridges, buildings, fences, dry marshes, or forests, as is now being done in all parts of the country from the use of coal or other solid fuels. Another and very important result obtained is that while the exhaust-gas is discharged into the furnace there will be no noise heard from the exhaust.

Fig. 13 is an illustration of a broken longitudinal central section of a steamship, showing a high-pressure gas or gaseous-vapor generator located in the boiler-room.

The high-pressure gas or gaseous-vapor generator shown in Fig. 1 is intended to generate gas or gaseous vapor for motive power and heating purposes. The generative force is conducted through pipe $s^{\prime}$ to the engine $x$, the exhaust of which is into and through pipe $a^4$, and from thence it is discharged into the furnace of the generator, where it is burned, the heat of which is utilized in generating more gas or gaseous vapor. The combustible liquid is drawn from a sectional reservoir, $o^7$, which may be located in any suitable part of the ship. The one shown in the drawings is located in the stern of the ship, or at the furthermost point from the fire in the furnace of the gas-generator. The sectional reservoir consists of a suitable number of cylinders, which are made from some suitable material, and they each hold about one hundred gallons, more or less. One important feature of the sectional reservoir is that it is located in a water-tight compartment, which is filled with the water, in which the ship floats or moves. The cylinders are supported by two plates, $p^7$. A suitable interval or space is allowed between the two bulk-heads $b^7$ and $s^7$ and the ends of the cylinders. These cylinders are connected by a series of pipes, $m^7$ and $n^7$. The pipe-connection is shown more clearly in Fig. 15. The pipe $b^8$, above the top tier of the cylinder $o^7$, communicates with all of the cylinders contained in the reservoir, and it is the means by which the cylinders are filled with combustible liquid. This liquid can be pumped from a suitable reservoir or tank along the side of a wharf or from a floating vessel, $O^a$, or vehicle, (shown in Fig. 14,) and, also, when the elevation of the reservoir or tank is elevated above the inlet of pipe $b^8$, the liquid will run in by its own gravity, while at the same time the cylinders are filling the air which is being displaced is forced out through the pipe $x^7$ and $a^8$. This pipe should be left open for the purpose of admitting air to follow the surface of the liquid while the liquid is being drawn therefrom to the generator, (shown in the boiler-room, Fig. 13.) The wall $r^7$, adjacent to the propeller-shaft, is broken away, as indicated by $u$, (shown in Fig. 13,) thus showing the connection of the eduction-pipe $k$ with the last or bottom cylinder of the cylindrical reservoir, which is shown as being upon one side of the ship, while a similar reservoir is shown upon both sides of the ship in cross-section, Fig. 14. Both reservoirs can be connected and the contents thereof be discharged through one eduction-pipe.

The holes $v^7$ and $w^7$ are for the purpose of admitting the water in which the vessel floats to flow in and out the compartment, whereby the combustible liquid will be kept to the same temperature as the water through which the ship moves. Consequently by the means herein described for transporting liquid fuel there can be no danger of explosions, for no heat can get to the reservoir to volatilize the liquid fuel, and if one tank should give away or leak the contents would rise and sink and pass off through the two apertures $v^7$ and $w^7$. These apertures can be so arranged that a continuous current of water will flow through the compartment while the ship is on its voyage.

The check-valve $l^7$ on pipe $k$ is to prevent any back-pressure on the sectional reservoir, which might accidentally occur with a defective device for forcing the water and liquid fuel into the generator.

A highly-important feature of this invention is that sea-water can be drawn from the compartments or other suitable places and forced with the liquid fuel into the generator, where the aqueous matter will combine with said liquid fuel and form a gas or gaseous vapor, while the salt will be precipitated at a point for removal by a trap or some other means. There will be no danger whatever of clogging or scaling the conduits with either salt or water which is impregnated with other salts, for the action of the water and steam in one of these generators is such that the security from scaling is complete, and is rendered doubly so when a gaseous vapor is generated therein.

All of the condensation and precipitation of salts and other matter can be trapped off and discharged overboard. Therefore no attention need be paid to the interior condition of the generator while on a voyage. No fresh water need be carried for steam-power purposes. The item of expense for tankage disappears, and the space heretofore occupied therefor will be devoted to profitable uses; and, also, the coal-bunkers now in use will be entirely dispensed with, and the space occupied therefor can be devoted to freight.

As about three-fourths of the heat for generating the motive power to propel the ship with can be derived from the water through which said ship is moving, it will be readily seen that nearly three-fourths of the coal and all of the water which are now taken on board for motive-power purposes while the ship is in port can be dispensed with, while an equivalent for the remaining—nearly one-fourth of coal or carbon required—can be carried in a liquid form in the reservoir provided for the purpose, and which can be located in any suitable place within the ship.

Another very important feature in connection with marine navigation is that the high-pressure generator which generates the gas or gaseous vapor does not carry but a very small amount of water when compared with the amount carried in marine boilers now in use—that is, where the generative powers of the two classes of generators are equal; and, furthermore, the weight and space occupied for equal power are about as two to five, or about three-fifths in favor of the high-pressure gas or gaseous-vapor generator.

One, two, or more of these generators can be used, in accordance with the power required. When two or more are used the gas or gaseous vapor can be discharged into the same dome, and from thence conducted to the engines; or the gas or gaseous vapor can be discharged through separate pipes leading to the engines; but in any case a valve should be placed between the discharge of the generator and the pipes leading to the above-mentioned dome, or on the pipes leading to the engines, for the purpose of cutting off the communication between said generator, dome, or engines when repairs are made necessary by accident or otherwise. As these generators are independent of each other, so far as their furnaces are concerned, it becomes an easy matter to stop the pump and to check the exhaust, whereby the fire is put out and the generation of gas ceases, after which the apparatus cools off, thus allowing the two doors to be swung open and the necessary repairs to be made, and the apparatus put in order; after which turn the valve on the exhaust-pipe, thus admitting the exhausted gas or gaseous vapor into the furnace, wherein it is burned, the heat of which generates gas or gaseous vapor, which is now forced into the engine on opening the valve on the eduction-pipe. In the meantime, while the generator is undergoing repairs, the remaining generator or generators are producing motive power to propel the ship with. Consequently by the use of two or more of the above-mentioned high-pressure generators the ship can be kept constantly moving while on her voyage.

One great advantage over the low-pressure marine boilers now in use is that a high-pressure motive power can be obtained in the high-pressure generating apparatus, and a force can be generated under a pressure exceeding five hundred pounds, if necessary, or at any pressure thereunder; and as it is practical to run the engines with steam at three hundred pounds pressure it can be seen that the result in speed of the ship must be greatly in excess of what it would be were its engines driven by a motive force not to exceed the pressure of thirty or forty pounds per square inch plus the difference between the vacuum-pressure minus the force with which said vacuum is produced; but by the use of the high-pressure gas or gaseous-vapor generator a far greater power than above mentioned can be obtained and practically utilized. A pressure exceeding one thousand pounds per square inch can be generated by expanding or forcing asunder the elementary properties constituting water, water and combustible liquids or solids by heat; but said high pressure, when generated from water alone, cannot be practically utilized for a motive power to drive an engine, for the reason that the excessive heat transmitted in the motive power will destroy any known ungent or lubricant now in use, in consequence of which the frictional parts of an engine would wear away in a very short time, thereby ruining the engine, and, also, other existing causes would prohibit the use of very high-pressure steam; but the injurious results occurring from the use of a high-pressure motive power generated from water does not occur by the use of a high-pressure gas generated and utilized in accordance with the following method:

The high-pressure gas or gaseous-vapor generator must be made in the most durable manner and of the very best material. All of the coils in which the gas is generated must be made from the best iron attainable. The superheater should be made of double extra strong pipe or tubing, and also several of the spiral conduits which are in close proximity to the furnace, while the remaining conduits can be made from extra strong pipe or tubing, which will be strong enough to withstand the high pressure of a thousand pounds to the square inch and still retain as a factor of safety a resisting force of over two thousand pounds per square inch. The same may also be said of the lower spiral conduits and the superheater. This factor of safety, when such high pressure is evolved, should be well attended to, for the reason that the coils must be heated to a high degree of heat in order to evolve the high pressure above mentioned. The connecting-pipes, fittings, and all of the necessary adjuncts pertaining thereto must be extra strong, and to be on the safe side of danger a factor of resistive force more than equaling or exceeding the high pressure should be required and enforced under any and all circumstances.

The combustible liquid and water are forced into the high-pressure generator and converted to a fixed water-gas, which will not, on cooling, return to its original condition, but will retain the same elastic force acquired under heat. Now, while in this condition, or when heated to 300° temperature, it can be used as a motive force to drive engines with. Therefore, in order to obtain this condition, the fixed water-gas must pass through a cooler or a suitable coil of pipes located in a cistern or tank in which there is a constant current of cold water passing through, as shown in Fig. 16. This can be effected in various ways, one of which would be to form a connection between the sea-water and tank by means of a pipe, which can be done by projecting the pipe through the hull of the ship, or by connecting said pipe and tank with the compartment in which the sectional reservoirs are placed. Another pipe should connect the tank with the pump which feeds the generator, so that whatever heat is imparted to the water can again be returned to the said generator. Thus heat equaling the amount of the reduction in the gas minus the radiation will be returned to the generator, while the cooled gas, which may still retain 300° temperature, and without loss of pressure, can now be utilized without injury to the engine, while the exhaust-gas thereof can be returned to the generator for combustion, as hereinbefore specified. The loss of heat in the exhaust-gas which is returned to the furnace is returned by the water into the conduits, whereby the effect in an economical point of view will be about the same as would be the case were all of the heat returned by way of the exhaust; but whatever loss there may be the gain in motive power will be far in excess of whatever loss can occur from the above-mentioned sources. Now, with the enormous decrease of tonnage, as hereinbefore mentioned, in coal, water-condensers, difference in weight of generators, and all of the necessary adjuncts pertaining thereto, it is reasonable to infer that with the great motive force attainable in the high-pressure gas or gaseous-vapor generator that a motive-power gas-ship should be propelled from shore to shore of the Atlantic in less time than has ever been done before.

Another important advantage gained by the use of the high-pressure gas and gaseous-vapor generator is that gas can be generated for heating and illuminating purposes on or in the said ship. Gas holders or cylinders can be filled with compressed gas for subsequent uses. A gas-holder made upon a similar principal involved in the sectional cylindrical reservoir can be constructed and located in some obscure part of the ship, where the gas can be forced therein by a connecting-pipe, and thence distributed therefrom to whatever place required. A valve for equalizing the pressure at the burner should be attached at or near the holder. This gas can be purified, if necessary, and the heat reduced prior to its entering the holder.

What I claim, and desire to secure by Letters Patent, is—

1. The herein-described process for generating motive power for locomotives, consisting of forcing water and combustible liquid under pressure into a high-pressure gas or gaseous-vapor generator, thence discharging said gas or gaseous vapor into the cylinders of a locomotive, while the exhaust-gas therefrom is discharged into the furnace of the generator and burned to supply the heat to generate the said gas or gaseous vapor for the motive power.

2. In a locomotive-tender, the herein-described apparatus for transporting liquids from which motive power and fuel are generated for driving a locomotive-tender and train of cars, consisting of a water-tank provided with suitable sectional reservoirs fixed at suitable distances apart and connected by suitable connections, whereby the said reservoirs can be filled with combustible liquids, and from which said liquids are drawn and forced into an apparatus for generating gas for locomotives.

3. A locomotive-tender provided with a suitable chamber or holder for storing gas, in combination with an apparatus for generating the gas to be stored in said chamber, and means for connecting the said chamber with the furnace of the locomotive, as described.

4. In a locomotive-tender, the combination of reservoirs for holding water and liquid combustibles with a gas-holder and means for connecting said locomotive, for the purposes described.

5. The process or mode of driving engines with extreme high-pressure fixed gas, consisting of forcing water and combustible liquid into a high-pressure generator, wherein a fixed gas is formed, thence conducting the said gas into a cooling device, wherein a suitable degree of temperature is absorbed, and thence discharged into an engine or motor, from whence it is discharged through the exhaust-pipe into the furnace of said generator and burned.

6. The combination of a high-pressure-gas generator, engine or motor, and cooling device for cooling the gas prior to its discharge into the said engine or motor, and then utilized as fuel, for the purpose described.

7. The process or mode of generating a high-pressure fixed gas for motive power and heating purposes, and cooling or partially cooling the same and utilizing the absorbed heat for heating the feed-water, which is forced into a high-pressure-gas generator, for the purpose described.

8. The mode of storing combustible liquid in a floating vessel, consisting of a reservoir or reservoirs suitably connected and located in a suitable manner in a compartment or compartments filled with water, whereby the combustible liquid is kept at an even temperature by the circulation of the water through which the vessel moves, the water passing through said compartment or compartments, substantially as described.

WM. FRANK BROWNE.

Witnesses:
R. SYLVANI,
E. A. LEGRAND.